(12) United States Patent
Huang

(10) Patent No.: US 8,014,160 B2
(45) Date of Patent: Sep. 6, 2011

(54) UNIVERSAL SERIAL BUS MEMORY DEVICE

(75) Inventor: Chin-Wen Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 193 days.

(21) Appl. No.: 12/485,939

(22) Filed: Jun. 17, 2009

(65) Prior Publication Data
US 2009/0323297 A1    Dec. 31, 2009

(30) Foreign Application Priority Data
Jun. 27, 2008    (CN) .................. 2008 1 0302381.3

(51) Int. Cl.
*H01R 13/502*    (2006.01)
(52) U.S. Cl. ..... 361/752; 361/729; 361/730; 174/50.52; 439/701
(58) Field of Classification Search .................. 361/737, 361/752, 731, 730, 729; 174/50.52, 50.54; 439/76.1, 701
See application file for complete search history.

(56) References Cited

U.S. PATENT DOCUMENTS

| 6,567,273 | B1 * | 5/2003 | Liu et al. .................. 361/737 |
| D484,094 | S * | 12/2003 | Xiao .................. D14/435.1 |
| 7,128,615 | B1 * | 10/2006 | Liao .................. 439/640 |
| 7,140,910 | B1 * | 11/2006 | Liao .................. 439/502 |
| 7,749,015 | B2 * | 7/2010 | Uchikawa et al. ........... 439/362 |
| D629,805 | S * | 12/2010 | Nysen et al. ............ D14/433 |
| 2002/0081878 | A1 * | 6/2002 | Bruno .................. 439/164 |
| 2003/0216060 | A1 * | 11/2003 | Oh-Yang .................. 439/42 |
| 2004/0042735 | A1 * | 3/2004 | Ma .................. 385/88 |
| 2008/0041898 | A1 * | 2/2008 | Chou .................. 224/219 |

* cited by examiner

*Primary Examiner* — Dameon Levi
(74) *Attorney, Agent, or Firm* — Altis Law Group, Inc.

(57) ABSTRACT

A USB memory device includes a main body, a USB plug, and a circuit. The main body includes a front rigid section, a rear rigid section, and a middle flexible section connected to the front rigid section and the rear rigid section respectively. The USB plug is connected to the front rigid section. The circuit is received in the rear rigid section and electrically connected to the USB plug.

16 Claims, 4 Drawing Sheets

UNIVERSAL SERIAL BUS MEMORY DEVICE

BACKGROUND

1. Technical Field

The disclosure relates to memory devices, and particularly, to a universal serial bus (USB) memory device.

2. Description of Related Art

Generally, USB memory devices are used as an external storage device, when used, the USB memory devices are plugged into USB ports of electronic devices and are exposed to the risk of being inadvertently bumped. For example, when the USB memory devices are bumped during use, the USB plugs may suffer damage due to the impact. Additionally, internal circuits of the USB memory devices may also be damaged.

Accordingly, it is desirable to provide a USB memory device, which can overcome the above-mentioned problems.

DETAILED DESCRIPTION

Embodiments of the disclosure will now be described in detail with reference to the accompanying drawings.

Figure 1:
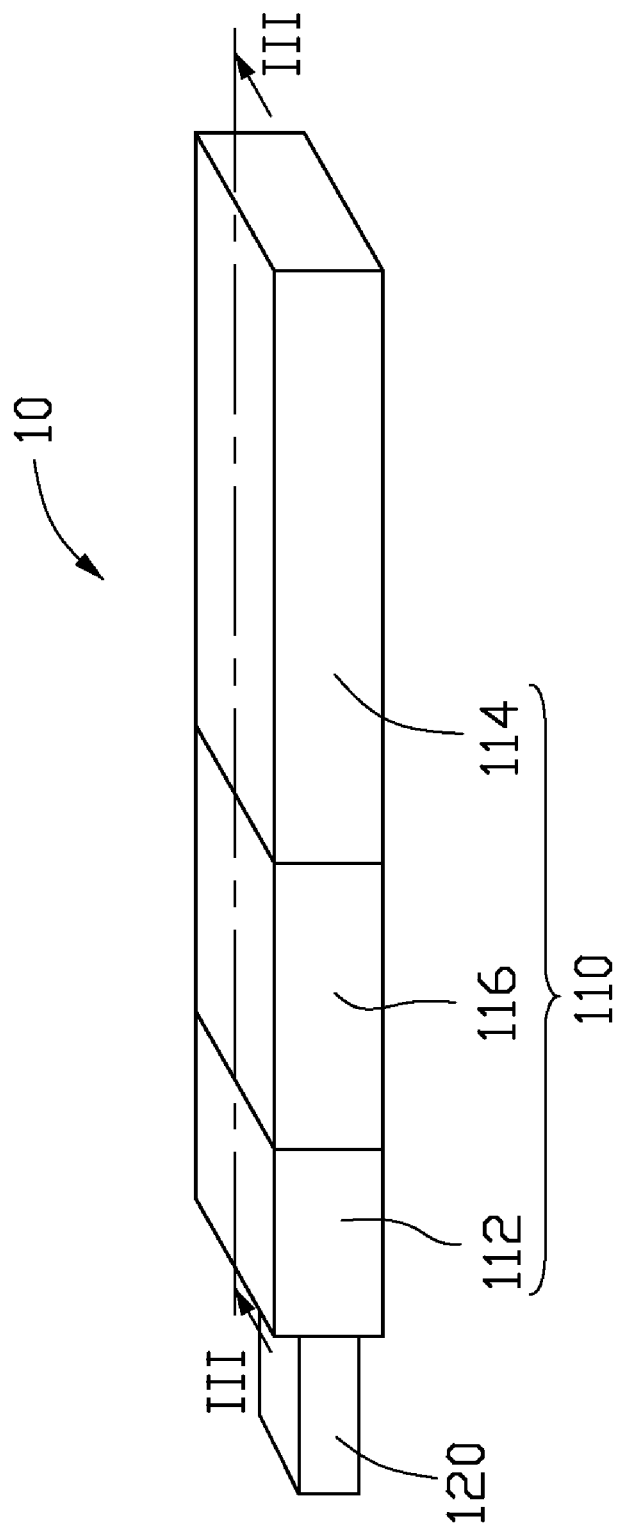
FIG. 1 is a schematic isometric view of a USB memory device according to a first embodiment.

Referring to FIG. 1, a USB memory device 10 according to a first embodiment is shown. The USB memory device 10 includes a main body 110, a USB plug 120, and a circuit 130 (see FIG. 3). The main body 110 is a hollow rectangular tube. The USB plug 120 is connected to the main body 110. The circuit 130 is received within the main body 110.

The main body 110 includes a front rigid section 112, a rear rigid section 114, and a middle flexible section 116. The front rigid section 112 wraps around a portion of the USB plug 120. The circuit 130 is received in the rear rigid section 114. The middle flexible section 116 interconnects the front rigid section 112 and the rear rigid section 114. The front rigid section 112 and the rear rigid section 114 are made from materials having high rigidity, such as duroplasts, to provide adequate mechanical strength for preventing the USB plug 120 and the circuit 130 from damage. The middle flexible section 116 is made of materials having high flexibility, such as rubber. Therefore, when the USB memory device 10 suffers an impact, the middle flexible section 116 deforms, thereby minimizing the damage of the USB memory device 10.

Figure 2:
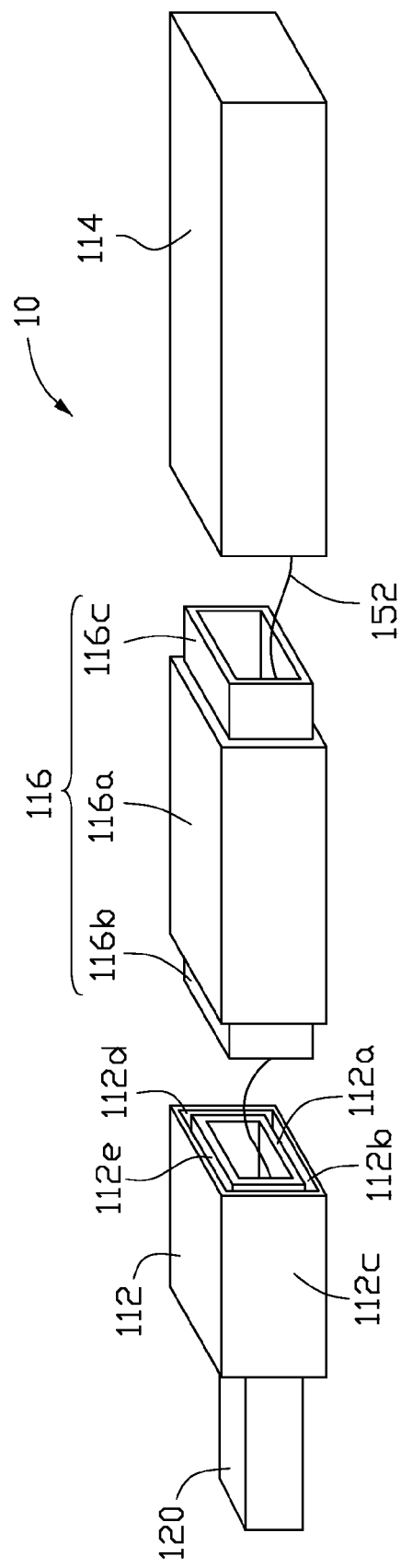
FIG. 2 is a schematic exploded view of the USB memory device of FIG. 1.
Figure 3:
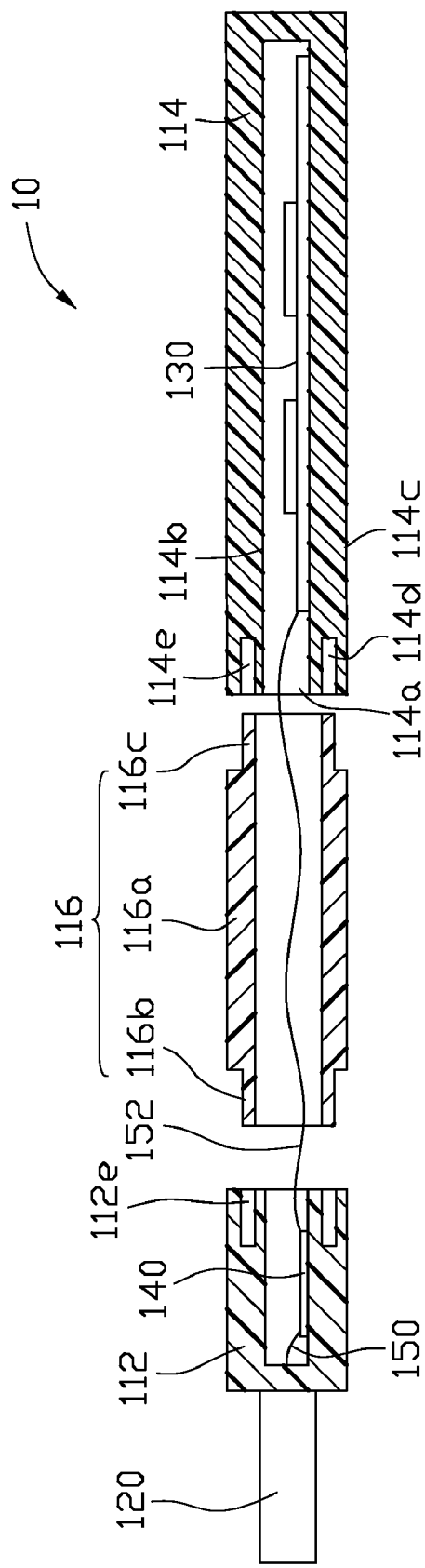
FIG. 3 is a schematic cross-sectional view of the USB memory device of FIG 2.

Referring to FIGS. 2-3, the front rigid section 112 defines a first opening 112a and includes a first inner surface 112b, a first outer surface 112c, and a first end surface 112d connecting to the first inner surface 112b and the first outer surface 112c. The front rigid section 112 also defines a first circular groove 112e in the first end surface 112d surrounding the first opening 112a. The rear rigid section 114 defines a second opening 114a, and includes a second inner surface 114b, a second outer surface 114c, and a second end surface 114d connecting to the second inner surface 114b and the second outer surface 114c. The rear rigid section 114 also defines a second circular groove 114e in the second end surface 114d surrounding the second opening 114a. The middle flexible section 116 includes a main portion 116a, a first connecting portion 116b, and a second connecting portion 116c protruding outward from two opposite ends of the main portion 116a correspondingly. The first connecting portion 116b and the second connecting portion 116c fit into the first circular groove 112e and the second circular groove 114e correspondingly. In this embodiment, the first and second connecting portion 116b and 116c are integrally formed with the main portion 116a.

The USB plug 120 is configured for plugging into a USB port of an electronic device (not shown).

The circuit 130 is electrically connected to the USB plug 120 for receiving, processing, and storing data transmitted from the electronic device or sending data to the electronic device.

In order to adapt the USB plug 120 to the circuit 130, an adapting circuit 140 is received in the front rigid section 112 and electrically connected to the USB plug 120 and the circuit 130 correspondingly. The USB plug 120 is electrically connected to the adapting circuit 140 by a first conductive wire 150. The adapting circuit 140 is electrically connected to the circuit 130 by a second conductive wire 152 passing through the middle flexible section 116 from the first opening 112a of the front rigid section 112 to the second opening 114a of the rear rigid section 114.

Figure 4:
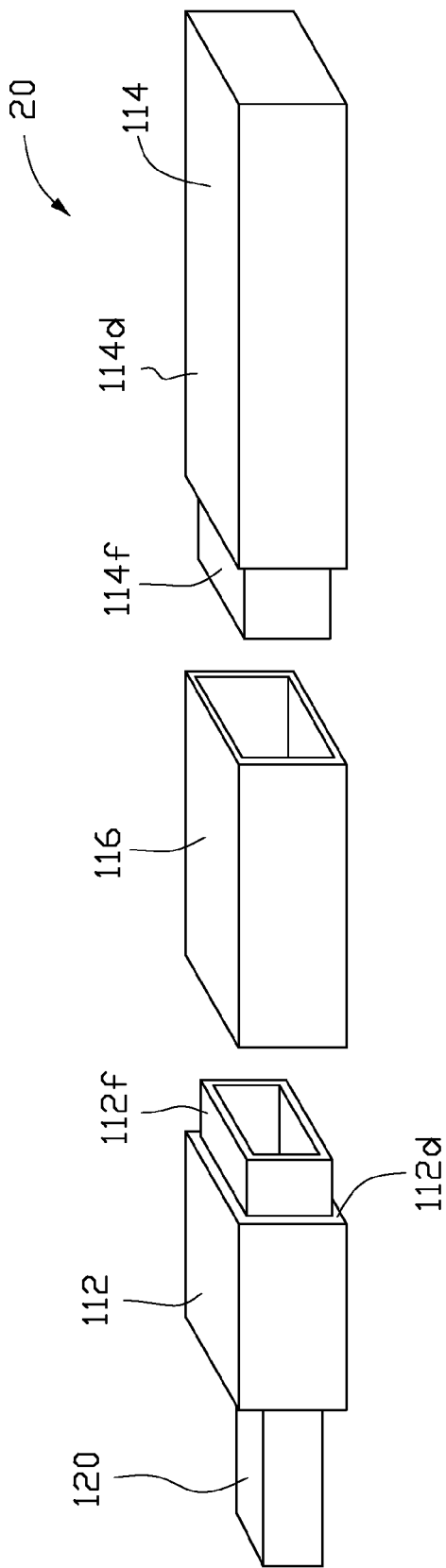
FIG. 4 is a schematic isometric view of a USB memory device according to a second embodiment.

FIG. 4 is a schematic view of a USB memory device 20 according to a second embodiment. The USB memory device 20 is essentially similar to the USB memory device 10 except that connecting manner between the middle flexible section 116 and the front rigid section 112, and between the middle flexible section 116 and the rear rigid section 114. In this embodiment, the front rigid section 112 includes a first protrusion 112f protruding outward from the first end surface 112d. The rear rigid section 114 includes a second protrusion 114f protruding outward from the second end surface 114d. The two ends of the main portion 116a wrap around the first protrusion 112f and the second protrusion 114f respectively. In order to increase connection strength, adhesive can be applied between the main portion 116a and the first protrusion 112f and the second protrusion 114f.

It is to be understood, however, that even though numerous characteristics and advantages of the embodiments have been set forth in the foregoing description, together with details of the structures and functions of the embodiments, the disclosure is illustrative only, and changes may be made in detail, especially in matters of arrangement of parts within the principles of the invention to the full extent indicated by the broad general meaning of the terms in which the appended claims are expressed.

What is claimed is:

1. A USB memory device comprising:
    a main body comprising a front rigid section that comprises a first outer surface, a rear rigid section that comprises a second outer surface, and a middle flexible section that comprises a third outer surface, wherein the middle flexible section is connected between the front rigid section and the rear rigid section, and the third outer surface is flush with the first outer surface and the second outer surface;
    a USB plug connected to the front rigid section; and
    a circuit received in the rear rigid section and electrically connected to the USB plug.

2. The USB memory device of claim 1, wherein: the front rigid section defines a first opening and includes a first inner surface, a first outer surface, and a first end surface connected to the first inner surface and the first outer surface; and the front rigid section defines a first circular groove in the first end surface surrounding the first opening.

3. The USB memory device of claim 2, wherein: the rear rigid section defines a second opening and includes a second inner surface, a second outer surface, and a second end surface connected to the second inner surface and the second outer surface; and the rear rigid section defines a second circular groove in the second end surface surrounding the second opening.

4. The USB memory device of claim 3, wherein the middle flexible section comprises a main portion, a first connecting portion, and a second connecting portion protruding outward from two opposite ends of the main portion correspondingly and defines a through hole extending though the main portion, the first connecting portion, and the second connecting portion, the first connecting portion and the second connecting portion fit into the first circular groove and the second circular groove respectively, and the through hole communicates with the first opening and the second opening.

5. The USB memory device of claim 4, wherein the first and second connecting portions are integrally formed on the two opposite ends of the main portion of the middle flexible section.

6. The USB memory device of claim 4, further comprising an adapting circuit, wherein the adapting circuit is received in the front rigid section of the main body and electrically connected to the USB plug by a first conductive wire.

7. The USB memory device of claim 6, wherein the adapting circuit is electrically connected to the circuit by a second conductive wire passing through the through hole of the middle flexible section from the first opening of the front rigid section to the second opening of the rear rigid section.

8. The USB memory device of claim 1, wherein the middle flexible section is made of materials having high flexibility.

9. The USB memory device of claim 8, wherein the middle flexible section is made of rubber.

10. The USB memory device of claim 1, wherein the front rigid section and the rear rigid section are made of materials having high rigidity.

11. The USB memory device of claim 10, wherein the front rigid section and the rear rigid section are made of duroplasts.

12. The USB memory device of claim 1, wherein the front rigid section comprises a first end surface and a first protrusion protruding outward from the first end surface of the front rigid section.

13. The USB memory device of claim 12, wherein the rear rigid section comprises a second end surface and a second protrusion protruding outward from the second opening of the rear rigid section.

14. The USB memory device of claim 13, wherein two ends of the middle flexible section wrap around the first protrusion and the second protrusion respectively.

15. The USB memory device of claim 1, wherein the middle flexible section is connected to the front rigid section and the rear rigid section by adhesive.

16. The USB memory device of claim 1, wherein the circuit is configured for receiving, processing, and storing data transmitted from an electronic device or sending data to an electronic device.

* * * * *